Figure 1:
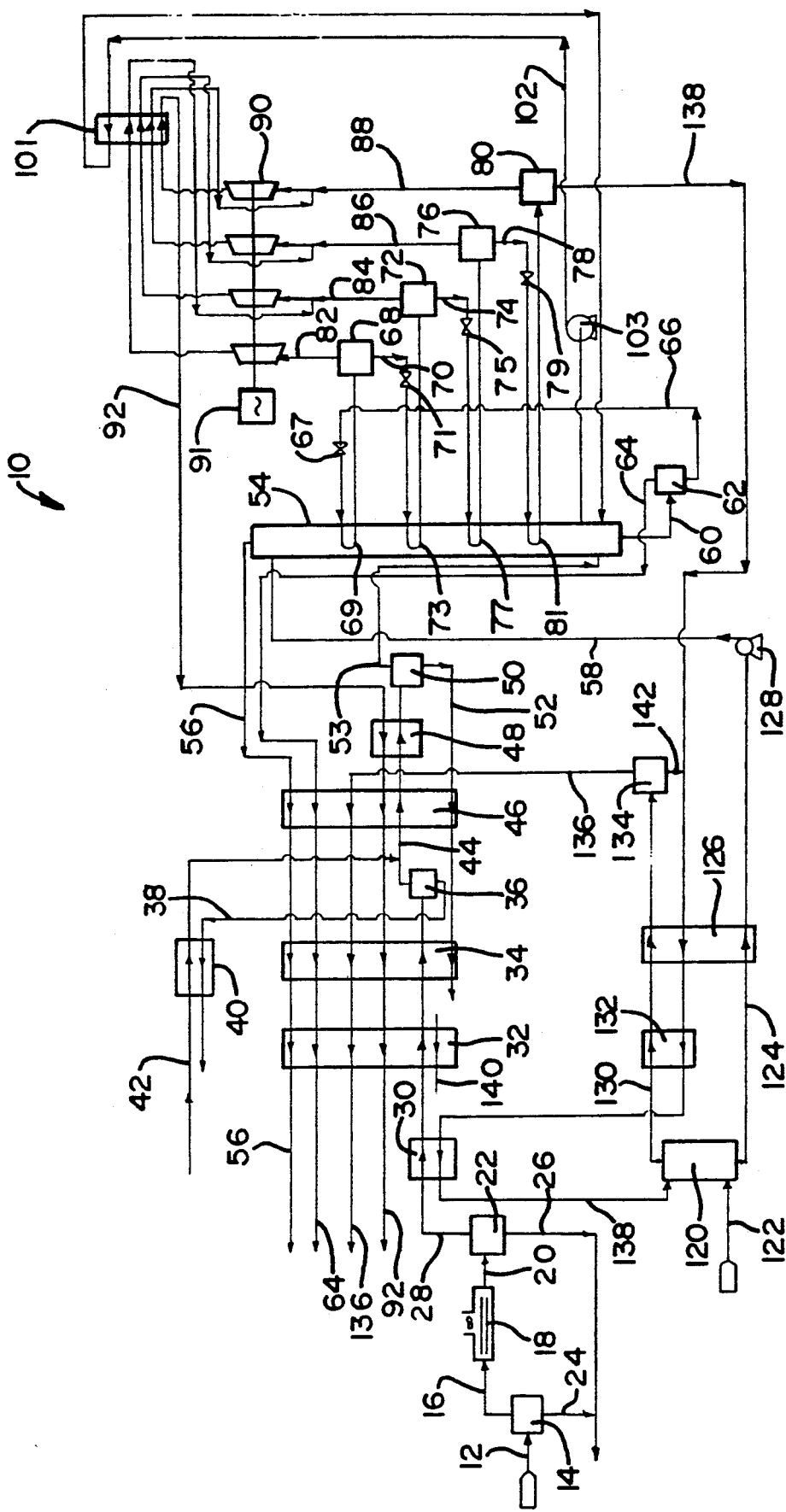

United States Patent [19]

Hemmings et al.

[11] Patent Number: 5,067,972
[45] Date of Patent: Nov. 26, 1991

[54] PURIFICATION OF GASES

[75] Inventors: John W. Hemmings, Randburg; Peter Allan; Gerald M. O'Shaughnessy, both of Johannesburg, all of South Africa

[73] Assignee: Aeci Limited, South Africa

[21] Appl. No.: 470,649

[22] Filed: Jan. 26, 1990

[30] Foreign Application Priority Data

Jan. 26, 1989 [ZA] South Africa .................. 89/0637
Dec. 18, 1989 [ZA] South Africa .................. 89/9705

[51] Int. Cl.$^5$ ............................................. B01D 53/14
[52] U.S. Cl. .................................... 55/40; 55/48; 55/73; 55/89
[58] Field of Search ............... 55/40, 48, 51, 73, 89

[56] References Cited

U.S. PATENT DOCUMENTS

| | | | |
|---|---|---|---|
| 3,266,219 | 8/1966 | Woertz | 55/73 X |
| 3,266,220 | 8/1966 | Woertz | 55/73 X |
| 3,498,067 | 3/1970 | Ranke | 62/17 |
| 3,975,172 | 8/1976 | Ranke | 55/73 X |
| 4,050,909 | 9/1977 | Ranke | 55/73 X |
| 4,057,403 | 11/1977 | Valdes | 55/73 X |
| 4,184,855 | 1/1980 | Butwell et al. | 55/73 X |
| 4,430,316 | 2/1984 | Ranke et al. | 55/73 X |
| 4,436,707 | 3/1984 | Karwat | 55/73 X |
| 4,478,799 | 10/1984 | Bengeser et al. | 55/73 X |
| 4,514,203 | 4/1985 | Gazzi et al. | 55/73 X |
| 4,591,370 | 5/1986 | Gazzi et al. | 55/73 X |
| 4,609,389 | 9/1986 | Karwat | 55/73 X |
| 4,702,750 | 10/1987 | Becker | 55/73 X |
| 4,710,211 | 12/1987 | Gazzi et al. | 55/73 X |
| 4,797,140 | 1/1989 | Landeck et al. | 55/73 X |
| 4,810,267 | 3/1989 | Landeck et al. | 55/73 |
| 4,834,781 | 5/1989 | Grünewald et al. | 55/73 X |
| 4,889,700 | 12/1989 | Elgue et al. | 55/73 X |

FOREIGN PATENT DOCUMENTS

| | | |
|---|---|---|
| 2759123 | 7/1979 | Fed. Rep. of Germany . |
| 59-164612 | 9/1984 | Japan . |
| 84/9430 | 12/1984 | South Africa . |
| 1196658 | 7/1970 | United Kingdom . |

OTHER PUBLICATIONS

Gas Purification, A. L. Kohl and F. C. Riesenfeld, 3rd ed., Gulf Publishing Co., Book Division, Houston, pp. 748-757 and 784-789.

Primary Examiner—Robert Spitzer
Attorney, Agent, or Firm—Cushman, Darby & Cushman

[57] ABSTRACT

A process 10 for removing acid gas components such as $CO_2$, $H_2S$ and/or COS from a gas stream includes feeding the gas stream into an absorption zone 54, and passing a suitable physical solvent at elevated pressure and reduced temperature counter-currently through the zone. Acid gas components are thus absorbed from the gas stream into the solvent. The absorption zone is maintained at substantially isothermal condition.

8 Claims, 2 Drawing Sheets

PURIFICATION OF GASES

This invention relates to the purification of gases. It relates in particular to a process for removing acid gases from a gas stream.

The Applicant is aware of a process for removing acid gas components such as $CO_2$, $H_2S$ and COS from a gas stream, which includes physically absorbing, i.e. without chemical reaction, these components from the gas stream by means of methanol at elevated pressure and reduced temperature in an adiabatic absorption zone in which the methanol flows counter-currently to the gas stream, with the methanol hence, as it absorbs the acid gases from the gas stream, being heated up due to latent heat liberated as the acid gases dissolve therein, thus reducing the solubility of the acid gases in the methanol at the point of exit of the methanol from the zone. This results in the costly low temperature methanol at the top of the absorption zone being wasted. The methanol is then regenerated by adiabatically striping or flashing the acid gas components from the methanol, with adiabatic flashing resulting in increased solubility of the undesired acid gas components as the pressure is reduced and the methanol temperature hence decreased as a result of the flashing, so that it becomes more difficult to remove the acid gas components as the methanol temperature decreases.

It is hence an object of the present invention to provide a process for removing acid gas components, such as $CO_2$, $H_2S$ and/or COS from a gas stream containing these acid gas components, whereby these problems are at least reduced.

Accordingly, the invention comprises, in a process for removing acid gas components such as $CO_2$, $H_2S$ and/or COS from a gas stream which includes feeding the gas stream into an absorption zone, and passing a suitable physical solvent at elevated pressure and reduced temperature counter-currently through the zone, thereby absorbing the acid gas components from the gas stream into the solvent, the step of maintaining the absorption zone at substantially isothermal condition.

The maintaining of the absorption zone at substantially isothermal condition may be effected by any suitable means. In one embodiment of the invention, it may be effected by means of cooling coils provided in the zone. Thus, when the absorption zone is provided by a trayed column, the cooling coils may be located on the trays.

In another embodiment of the invention, the absorption zone may comprise subzones, and the maintaining of the absorption zone at substantially isothermal condition may then be effected by providing intersubzone cooling.

The temperature at which the absorption zone is maintained may be below ambient, and even below 0° C. or 273K.

The process may include regenerating the spent solvent, and re-using the regenerated solvent. The solvent regeneration may include subjecting the spent solvent to flashing at reduced pressure in at least one flashing zone. The flashing may be effected isothermally, with heat hence being supplied to the flashing zone in order to maintain it in isothermal condition.

In one embodiment of the invention, the flashing zone may be provided by a kettle reboiler.

A plurality of successive flashing zones may be provided. Thus, the flashing zones may be arranged cascade fashion. The spent solvent may then additionally, or instead, be heated between flashing zones to provide the heat for the flashing zones.

The solvent may be any suitable solvent capable of physically absorbing the acid gas components at low temperature and elevated pressure, and releasing the acid gas components at reduced pressure. While it is believed that alcohols and related solvents such as ethanol, glycol, Selexol (trade name) can be used, methanol is preferred due to the high solubility of acid gas components such as $CO_2$ and $H_2S$ therein at low temperatures and high pressures, and the ready release thereof at reduced pressures.

The gas stream may be a synthesis gas stream at elevated pressure, e.g. that obtained from a coal gasification process and which has been subjected to CO shift, with the process including cooling down the gas stream prior to feeding it to the absorption zone. The cooling down of the gas stream may be effected by heat exchanging it with one or more of the following: air, e.g. in an air cooler; cooling water; a gaseous fraction obtained from the isothermal flashing of the solvent; and/or a purified gas stream withdrawn from the absorption zone.

While the absorption can be effected at any temperature below the solvent boiling point, it is normally beneficial to operate the absorption zone at temperatures below ambient and at elevated pressure by virtue of the trade-off between solvent flow rate and temperature/pressure. Hence, the temperature to which the gas stream is typically cooled down is dependent on the pressure in the absorption zone. Typically, for an absorption zone pressure of about 30 bar, the gas stream temperature may be lowered to between 193K and 273K, typically to between 233K and 238K, prior to feeding it into the absorption zone, which will hence be maintained at this temperature. However, the pressure in the absorption zone may typically be maintained at between 5 bar (abs) and 100 bar (abs), with the temperature to which the gas stream is cooled then being adjusted accordingly so as to obtain the gas stream at a temperature sufficiently low for absorption of acid gas components therefrom, but not sufficiently low to obtain liquefaction of products, e.g. liquefaction of $CO_2$.

Typically, five flashing zones may be provided, with each zone being heated with heat from the absorption zone, the flashing pressure in each zone, when the absorption zone pressure is about 30 bar, then typically being about 10, 6, 3.8, 2.5 and 1.6 bar respectively. The flashing zones will be maintained at substantially isothermal conditions with at most only limited temperature drop, say, 5–10K, taking place over the flashing zones.

The flashed gaseous streams from the flashing zones may be expanded through a multistage turbine prior to utilizing them to precool the gas stream to the absorption zone.

Dependent on the degree of gas purification required, the methanol regeneration may also include a hot generation stage where residual acid gases are stripped from the methanol at a higher temperature by means of a suitable stripping gas such as nitrogen. The methanol may be heated to a temperature above 273K prior to feeding it into the hot regeneration stage, e.g. to a temperature between 310 and 320K.

The methanol regeneration may also include removing residual water and naphtha from the solvent. This may be effected by drawing a side stream of solvent from a suitable location, typically at the exit of the hot regeneration stage, processing the side stream, e.g. by means of distillation and/or solvent extraction, to remove water and naphtha therefrom, and returning the side stream to a suitable location in the process. The volume of solvent withdrawn as a side stream will be such as to keep the water content of the circulating solvent, i.e. re-used spent-regenerated solvent, at a suitably low specification, e.g. between 1% and 3% on a mass basis.

Figure 2:
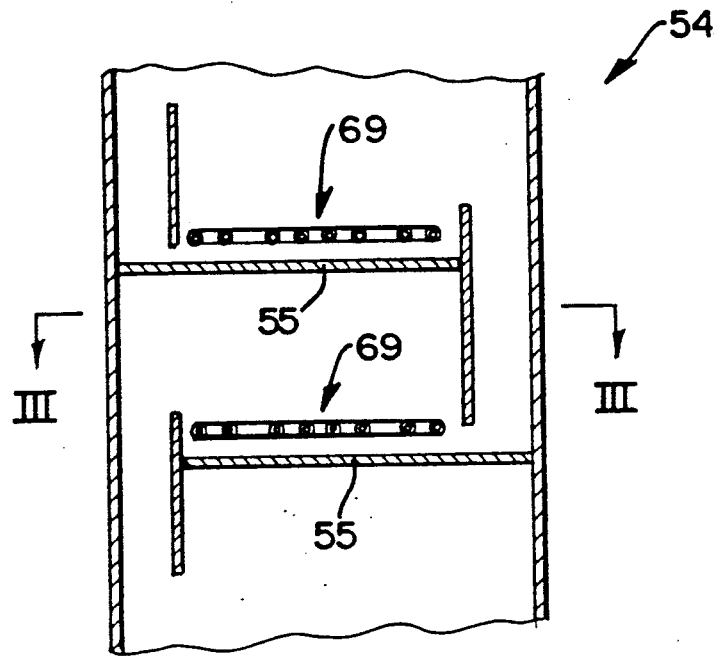
Figure 3:
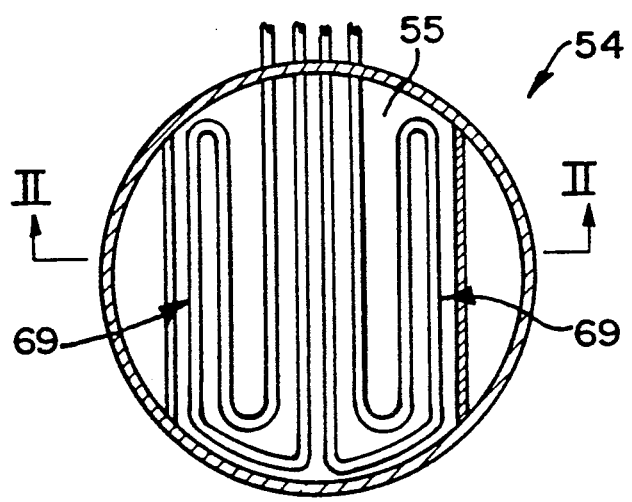

The invention will now be described by way of example, with reference to the accompanying diagrammatic drawings. In the drawings, FIG. 1 shows a flow sheet of a process for removing acid gas components from a gas stream, according to the invention; and FIG. 2 shows a vertical sectional view through II—II in FIG. 3, of part of the absorption column of FIG. 1; and FIG. 3 shows a sectional view through III—III in FIG. 2.

In the drawings, reference numeral 10 generally indicates a process for removing acid gas components from a gas stream.

The process 10 includes a flow line 12 along which a raw gas stream enters the process. The flow line 12 leads into a gas/liquid separator 14, with a gas stream flow line 16 leading from the separator 14 to an air-cooled heat exchanger 18. A flow line 20 leads from the air-cooled heat exchanger 18 to a gas liquid separator 22. Bottoms or liquid flow lines 24, 26 lead from the separators 14, 22 respectively, and combine to form a single flow line.

A gas flow line 28 leads from the separator 22, through a heat exchanger 30, through further heat exchangers 32, 34, to a gas/liquid separator 36. A liquid flow line 38 leads from the separator 36, through a heat exchanger 40, and leads to the battery limit of the process for further treatment or use. A methanol injection flow line 42 leads through the heat exchanger 40 where it is cooled down by heat exchange with the stream flowing along the flow line 38, to be injected into a gas flow line 44 leading from the separator 36. The flow line 44 leads through a heat exchanger 46 and a further heat exchanger 48 into a gas/liquid separator 50. A condensate flow line 52 leads from the bottom of the separator 50, through the heat exchangers 46, 34, so that the condensate therein (a mixture of methanol, water and naphtha) serves to cool down the incoming or feed gas stream flowing along the flow line 28. The flow line 52 passes through the battery limit for further processing (not shown) of the condensate to remove water and naphtha and to recover methanol for re-use. A gas flow line 53 leads from the separator 50 into the bottom of an absorber 54. A gaseous flow line 56 leads from the top of the absorber 54, and passes through the heat exchangers 46, 34 and 32 so that a purified gas stream flowing along it acts to cool the incoming feed gas flowing along the flow line 28. A regenerated absorbent flow line 58 leads into the top of the absorber 54, while a spent absorbent flow line 60 leads from the bottom of the absorber 54.

The flow line 60 leads to a first flash vessel 62, with a gaseous flow line 64 leading from the flash vessel 62 through the heat exchangers 46, 34, 32, so that a fuel gas stream flowing along it serves to cool down the incoming raw gas flowing along the flow line 28. A flow line 66, fitted with a let-down valve 67 as well as a set of cooling coils 69 on trays 55 of the column 54, leads from the bottom of the vessel 62 into a second flash vessel 68. A bottoms flow line 70, fitted with a let-down valve 71 as well as a set of cooling coils 73 on further trays of the column 54, leads from the flash vessel 68 to a third flash vessel 72, with a bottoms flow line 74, fitted with a let-down valve 75 and a set of cooling coils 77, leading from the third flash vessel 72 to a fourth flash vessel 76. A bottoms flow line 78, fitted with a let-down valve 79 and a set of cooling coils 81, leads from the flash vessel 76 to a fifth flash vessel 80.

The sets of coils 69, 73, 77 and 81 ensure that heat is transferred between the absorber 54 and the flash vessels 68, 72, 76 and 80 respectively. The flash vessels are hence controlled to operate at pressures which will result in the column 54 operating under substantially isothermal conditions.

A flow line 102, fitted with a pump 103, leads from the lower part of the column 54, through a heat exchanger 101, back to the bottom of the column. A partially loaded methanol stream is withdrawn via this line.

Gas flow lines 82, 84, 86 and 88 lead from the flash vessels 68, 72, 76 and 80 respectively, through different stages of a multistage expansion turbine 90 and through different passages of the heat exchanger 101. Hence, acid gas components are released or desorbed from the solvent in the flash vessels 62, 68, 72, 76 an 80, thereby partially to regenerate the solvent. Expanded gas is heated in the heat exchanger 101 at various pressure levels, thereby cooling the partially loaded methanol stream. Hence, heat is removed from the bottom zone of the column 54 by means of the refrigeration derived from the expansion of the acid gas in the stages of the expansion turbine, with this refrigeration being used to cool the partially regenerated methanol before its return to the column.

A flow line 92 leads from the final stage of the multistage turbine through the heat exchangers 48, 46, 34 and 32.

Power derived from the turbine 90 is removed in a useful fashion by means of a generator 91.

The process 10 also includes a stripper 120 for hot-stripping of residual acid gases from the partially regenerated methanol. A gaseous stripping agent, e.g. nitrogen flow line 122, leads into the bottom of the stripper 120, with a regenerated solvent flow line 124 leading from the bottom of the stripper 120, through a heat exchanger 126 to the suction side of a pump 128, with the flow line 58 which leads to the absorber 54, extending from the discharge side of the pump 128. A gaseous off-gas flow line 130 leads from the top of the stripper 120, through a heat exchanger 132, through the heat exchanger 126, to a phase separator 134. An off-gas flow line 136 leads from the top of the separator 134, through the heat exchangers 46, 34, 32, thereby serving to cool down the raw gas entering via the flow line 28.

A bottoms flow line 138 leads from the bottom of the fifth flash vessel 80 through the heat exchangers 126, 132, through the heat exchanger 30; to the top of the stripper 120. A liquid (methanol) flow line 142 leads from the separator 134 to the flow line 138.

A cooling water flow line 140 also leads into and from the heat exchanger 32 for use in cooling down the raw gas flowing along the flow line 28.

In an example of a process 10 utilizing the flow sheet hereinbefore described, gas from a coal gasification process (not shown) can be subjected to CO shift. The resultant raw gas can typically enter the process along the flow line 12 at a temperature of about 353K and may typically have the following approximate composition (with all percentages in this specification being on a molar basis unless otherwise indicated):

| | |
|---|---|
| $CO_2$ | 21,7% |
| CO | 16,2% |
| $H_2$ | 30,8% |
| $CH_4$ | 8,3% |
| $C_2H_6$ | 0,4% |
| $H_2S$ | 0,3% |
| $H_2O$ | 22,3% |
| COS | 0.03%. |

The raw gas enters at a pressure of about 30 bar.

In the separator 14 condensates consisting mainly of water and naphtha are separated from the gaseous fraction which passes, via the flow line 16, 20, through the air-cooled heat exchanger where it is cooled down to about 333K before entering the second separator 22. Again, condensates consisting mainly of water and naphtha are removed along the flow line 26, with the gaseous stream passing via the flow line 28 through the heat exchanger 30 where it is cooled down by heat exchange with partially regenerated solvent, i.e. methanol, through the heat exchanger 32 where it is cooled down by heat exchange with cooling water along flow line 140, low pressure carbon dioxide-rich gas stream along flow line 92, off-gas along flow line 136, fuel gas along flow line 64, and purified gas along flow line 56. It then passes through the heat exchanger 34 where it is cooled down further by heat exchange with the same streams save that the flow line 140 is replaced by the flow line 52. The raw gas temperature after the heat exchanger 30 is about 309K, while its temperature after the exchanger 32 is about 292K, and after the heat exchanger 34 about 278K.

In the separator 36 a gas fraction is separated from condensate in the form of a two-phase liquid stream consisting of a naphtha phase and an aqueous phase. The condensate is removed via the flow line 38, and is used to cool down methanol entering the process via the flow line 42. This methanol stream is injected into the flow line 44 downstream of the separator 36.

The injection of methanol is to prevent water and naphtha from freezing in the flow line 44. The raw gas/methanol mixture passing along the flow line 44 is cooled down to about 239K in the heat exchanger 46 by heat-exchanging it with the same flow streams as used in the heat exchanger 34.

Finally, in the heat exchanger 48 the fed stream is cooled down to about 236K by heat exchange with a low pressure carbon dioxide-rich stream passing along the flow line 32.

In the phase separator 50 a condensate stream consisting of a mixture of methanol, water and naphtha, with small amounts of dissolved gases, is removed via the flow line 52 which passes through the heat exchangers 46, 34 to the battery limit of the process. This condensate stream can be treated (not shown), e.g. by means of distillation, to recover methanol and to obtain naphtha as a product.

A gaseous stream passes from the separator 50 along the flow line 53 into the bottom of the absorber 54. Typically, the feed stream along flow line 53 has the following composition:

| | |
|---|---|
| $CO_2$ | 27,9% |
| CO | 20,8% |
| $H_2$ | 39,7% |
| $CH_4$ | 10,7% |
| $C_2H_6$ | 0,5% |
| $H_2S$ | 0,4% |
| $H_2O$ | 0,04% |
| COS | 0,04%. |

The absorber functions by injecting into the top thereof regenerated solvent via the flow line 58, while feeding the gaseous feed stream into the bottom of the absorber 54 via the flow line 52. The absorber 54, which is a trayed column, is maintained at about 30 bar, and is maintained isothermally at about 236K. This is effected by means of the cooling coils on the plates of the column as hereinbefore described, since the temperature of the methanol flowing down the column tends to increase as $CO_2$ and $H_2S$ are absorbed.

The composition of the solvent stream entering the absorber 54 via the flow line 58 is typically about 99% methanol and 1% water, with this liquid stream also entering the column at 236K, and the molar ratio of gas feed stream to solvent stream typically being about 1:0,7.

By operating the absorber 54 in isothermal fashion, effective absorption of acid gas components such as $H_2S$, $CO_2$ and COS can effected as is evident from the composition of the purified gas stream withdrawn from the top of the absorber 54 via the flow line 56, viz:

| | |
|---|---|
| $CO_2$ | 3,0% |
| CO | 28,3% |
| $H_2$ | 54,0% |
| $CH_4$ | 14,2% |
| $C_2H_6$ | 0,5% |
| $H_2S$ | about 1 ppm |
| methanol | ,01% |
| COS | negligible amounts. |

The composition of the acid gas-laden or spent solvent stream withdrawn from the bottom of the absorber 54 via the flow line 60 is typically

| | |
|---|---|
| $CO_2$ | 28,2% |
| CO | 0,1% |
| $H_2$ | 0,04% |
| $CH_4$ | 0,4% |
| $C_2H_6$ | 0,1% |
| $H_2S$ | 0,4% |
| $H_2O$ | 0,7% |
| methanol | 70,0% |
| COS | 0,04%. |

The molar ratio of the pure gas stream to the spent solvent stream is typically 1:1,33.

In the first flash vessel 62 the spent solvent stream withdrawn from the bottom of the absorber 54 is expanded or flashed to 10 bar, resulting in a fuel gas composition, passing along the flow line 64, of about

| | |
|---|---|
| $CO_2$ | 62,7% |
| CO | 10,2% |
| $H_2$ | 4,8% |
| $CH_4$ | 20,6% |
| $C_2H_6$ | 1,4% |
| $H_2S$ | 0,2% |
| methanol | 0,03% | with the spent solvent liquid stream withdrawn along the flow line 66, typically having the following composition:

| | |
|---|---|
| $CO_2$ | 27,9% |
| CO | 0,1% |
| $CH_4$ | 0,2% |
| $C_2H_6$ | 0,1% |
| $H_2S$ | 0,4% |
| $H_2O$ | 0,7% |
| methanol | 70,6% |
| COS | ,04%. |

The mole ratio of the fuel gas stream to the liquid stream is typically about 1:120.

The temperature in the flash vessel 62 is also maintained at about 236K by utilizing heat from the absorber 54, as hereinbefore described.

The bottoms or liquid stream from the flash vessel 62, passing along the flow line 66, enters the flash vessel 68 where it is flashed or expanded to a pressure of 6 bar. The gaseous overheads from the flash vessel 68, passing along flow line 82, have a composition as follows:

| | |
|---|---|
| $CO_2$ | 88,8% |
| CO | 0,7% |
| $CH_2$ | 0,1% |
| $CH_4$ | 8,4% |
| $C_2H_6$ | 1,7% |
| $H_2S$ | 0,3% |
| methanol | less than 0,1% |
| COS | less than 0,1%. |

The bottoms or liquid stream from the flash vessel 68, exiting via the flow line 70, has a composition as follows:

| | |
|---|---|
| $CO_2$ | 26,8% |
| $CH_4$ | 0,1% |
| $C_2H_6$ | 0,1% |
| $H_2S$ | 0,4% |
| $H_2O$ | 0,7% |
| methanol | 71,9% |
| COS | less than 0,1%. |

The molar ratio of the overheads to bottoms in the flash vessel 68 is about 1:50.

The bottoms from the flash vessel 68 enters the flash vessel 72 via the flow line 70, with the flash vessel 72 being maintained at a pressure of 3,8 bar. The overheads from the flash vessel 72, exiting via the flow line 84 has the following composition:

| | |
|---|---|
| $CO_2$ | 98,4% |
| $CH_4$ | 0,4% |
| $C_2H_6$ | 0,7% |
| $H_2S$ | 0,4% |
| methanol | less than 0.1% |
| COS | less than 0,1%. | while the liquid fraction exiting therefrom along the flow line 74 has the following composition:

| | |
|---|---|
| $CO_2$ | 16,9% |
| $H_2S$ | 0,4% |
| $H_2O$ | 0,8% |
| methanol | 81,8%. |
| COS | less than 0,1%. |

The molar ratio of the overheads to bottoms in the flash vessel 72 is about 1:7.

The bottoms from the flash vessel 72 in the flow line 74 is expanded into the flash vessel 76, which is maintained at a pressure of 2,5 bar. The overheads from the flash vessel 76, which passes along the flow line 86, has the following composition:

| | |
|---|---|
| $CO_2$ | 99,0% |
| $CH_4$ | less than 0,1% |
| $C_2H_6$ | 0,2% |
| $H_2S$ | 0,6% |
| methanol | less than 0,1% |
| COS | less than 0,1%. |

The bottoms from the flash vessel 76, which passes along flow line 78, has the following composition:

| | |
|---|---|
| $CO_2$ | 10,0% |
| $H_2S$ | 0,4% |
| $H_2O$ | 0,9% |
| methanol | 88,7% |
| COS | less than 0,1%. |

The molar ratio of overheads to bottoms in the flash vessel 76 is about 1:12.

The bottoms from the flash vessel 76 enters, via the flow line 78, the flash vessel 80 which is at a pressure of 1,6 bar. The gaseous overheads from the flash vessel 80, passing along flow line 88, ha the following composition:

| | |
|---|---|
| $CO_2$ | 98,8% |
| $H_2S$ | 0,8% |
| methanol | 0,1% |
| COS | 0,1%. |

The liquid bottoms from the flash vessel 80, passing along the flow line 138, has the following composition:

| | |
|---|---|
| $CO_2$ | 6,1% |
| $H_2S$ | 0,4% |
| $H_2O$ | 0,9% |
| methanol | 92,6% |
| COS | less than 0,1%. |

The molar ratio of overheads to bottoms in the vessel 80 is about 1:23.

The flash vessels 62, 68, 72, 76, 80 are maintained at about 233K by means of heat from the absorber 54, as hereinbefore described.

The gaseous overheads streams from the flash vessels 68, 72, 76 and 80, flowing along the flow lines 82, 84, 86 and 88 respectively, are expanded through different stages of the multistage turbine 90 with interstage heating being provided by heat from the absorber 54, as hereinbefore described. The spent gas from the turbine 90 passes, via the flow line 92, through the heat exchangers 48, 46, 34 and 32, for recovery as a low-pressure carbon dioxide-rich stream.

The partially regenerated methanol stream from the flash vessel 80 passes along the flow line 138 and through the heat exchangers 126, 132, 30 to the upper end of the hot stripper 120. The methanol-rich bottoms from separator 134, passing along the flow line 142, is added to this flow stream. Hence, the composition of the partially regenerated methanol stream on entering the stripper 120 is as follows:

| | |
|---|---|
| $CO_2$ | 5,8% |
| $H_2S$ | 0,4% |
| $H_2O$ | 0,9% |
| methanol | 92,9% |
| COS | less than 0,1%. |

The temperature of the partially regenerated methanol stream is about 230K immediately downstream of the flash vessel 80, 233K downstream of the point where the flow line 142 joins the flow line 138, 288K downstream of the heat exchanger 126, 306K downstream of the heat exchanger 132, and 313K downstream of the heat exchanger 30, i.e. on entering the stripper 120.

Pure nitrogen, at a temperature of about 298K, is fed into the bottom of the stripper as stripping agent. The molar ratio of nitrogen to the partially regenerated methanol flow stream entering the stripper via the flow line 138, is about 1:19. The stripper is maintained at about 1 bar.

An off-gas stream having a composition of about

| | |
|---|---|
| $CO_2$ | 33,4% |
| $H_2S$ | 2,2% |
| $N_2$ | 29,7% |
| methanol | 34,5% |
| COS | 0,2% | is withdrawn from the top of the stripper at a temperature of about 313K and passes along flow line 130. It is cooled down to about 292K on passing through the heat exchanger 132, and to about 236K on passing through the heat exchanger 126. The flow line 130 leads into the separator 134. The off-gas overheads from the separator 134, and having a composition as follows

| | |
|---|---|
| $CO_2$ | 50,6% |
| $H_2S$ | 3,0% |
| $N_2$ | 45,9% |
| methanol | 0,3% |
| COS | 0,3% | exits the separator 134 via the flow line 136 which passes through the heat exchangers 46, 34 and 32.

The regenerated methanol from the stripper 120, exiting via the flow line 124, has the following composition:

| | |
|---|---|
| $H_2O$ | 1,0% |
| methanol | 99,0%. |

It passes through the heat exchanger 126 to the suction side of the recirculation pump 128. From there it is pumped, via the flow line 58, back to the absorber 54. The temperature of this stream, on exiting the stripper 120, is about 292K, while its temperature after the heat exchanger 126 is about 236K, at which temperature it also enters the absorber 54.

The process can be designed such that the gas streams exiting the process via the flow lines 56, 64, 136, 92, i.e. downstream of the heat exchanger 32 at the battery limit, are at about ambient temperature.

Hence, with the process 10, the temperature in the absorber 54 is kept substantially constant, thereby avoiding the high solvent temperatures at the bottom of the absorber and the disadvantages associated therewith of known processes, as discussed hereinabove. In addition, the isothermal flashing to regenerate the solvent, the acid gas is recovered at a higher pressure than is the case with adiabatic flashing.

In the process 10, the heat required to be removed from the absorber 54 is necessarily substantially the same as that required to be added to the flash vessels since this heat is essentially the latent heat of condensation and evaporation, respectively, of the same acid gas components. Hence, by selecting the correct flash pressures inn the vessels 62, 68, 72, 76 and 80, the absorber 54 and flash vessels 62, 68, 72, 76 and 80 become essentially auto-refrigerating. The process 10 also requires less external refrigeration and power than known processes.

We claim:

1. A process for removing acid gas components from a gas stream, which comprises
    feeding the gas stream into an absorption zone;
    passing a suitable physical solvent at elevated pressure and reduced temperature countercurrently through the zone, thereby to absorb acid gas components from the gas stream into the solvent to form a spent or acid gas laden solvent;
    removing heat from the absorption zone, thereby to maintain the absorption zone at substantially isothermal condition;
    regenerating the spent or acid gas laden solvent by subjecting it to flashing at reduced pressure; and
    effecting the flashing substantially isothermally by utilizing heat removed from the absorption zone.

2. A process according to claim 1, wherein sufficient heat from the absorption zone is used so as to effect the isothermal flashing at a temperature several degrees below that of the absorption zone.

3. A process according to claim 1, wherein the flashing is effected in a plurality of successive flashing zones, with the flashing zones being arranged cascade fashion so that spent solvent from the absorption zone is fed into a first flashing zone in which it is subjected to flashing; thereafter the solvent is withdrawn from the first flashing zone and heated by means of heat removed from the absorption zone; the thus heated solvent is fed into a second flashing zone in which it is also subjected to flashing; solvent is withdrawn from the second flashing zone and heated by means of heat removed from the absorption zone; the thus heated solvent is fed into a third flashing zone; and so on, with the flashing zones thus being maintained substantially isothermally.

4. A process according to claim 3, wherein the heating of the solvent is effected by passing it, between each flashing zone, along a cooling coil provided in the absorption zone, with sufficient heat being removed from the absorption zone to maintain it isothermally at a temperature below ambient temperature.

5. A process according to claim 3, wherein the gas stream is a synthesis gas stream at elevated pressure, with the pressure in the absorption zone being maintained at between 5 bar (abs) and 100 bar (abs), and with the gas stream being cooled down, prior to it being fed into the absorption zone, to a temperature sufficiently low to permit absorption of acid gas components therefrom, but not so low as to obtain liquefaction of products, and with the flash gaseous streams from the flashing zones being expanded through a multi-stage turbine and thereafter being utilized to pre-cool the gas stream to the absorption zone.

6. A process according to claim 3, wherein the solvent from the last flashing zone is heated to a temperature above 273K, and thereafter fed to a hot regeneration stage in which residual acid gases are stripped from the solvent.

7. A process according to claim 6, wherein the solvent regeneration includes removing residual water and naphtha from the solvent by drawing a side stream of solvent from the hot regeneration stage, processing the side stream to remove water and naphtha therefrom, and returning the side stream to a suitable location in the process.

8. A process according to claim 1, wherein the solvent is methanol.

* * * * *